(12) United States Patent
Miron

(10) Patent No.: US 7,002,696 B1
(45) Date of Patent: Feb. 21, 2006

(54) BAND PASS INTERFEROMETER WITH TUNING CAPABILITIES

(75) Inventor: Nicolae Miron, Pierrefonds (CA)

(73) Assignee: Optune Technologies, St. Laurent (CA)

(*) Notice: Subject to any disclaimer, the term of this patent is extended or adjusted under 35 U.S.C. 154(b) by 174 days.

(21) Appl. No.: 09/705,447

(22) Filed: Nov. 3, 2000

(51) Int. Cl.
*G01B 9/02* (2006.01)

(52) U.S. Cl. .................................................. 356/519

(58) Field of Classification Search ................ 356/517, 356/519, 454, 480; 359/577, 578, 589; 372/32
See application file for complete search history.

(56) References Cited

U.S. PATENT DOCUMENTS 3,551,051 A * 12/1970 Salgo .......................... 250/330

(Continued)

FOREIGN PATENT DOCUMENTS

WO    WO 0041012    7/2000

OTHER PUBLICATIONS

M. Born, E. Wolf, "Principles of Optics," Chapter 7.6, pp. 359-409, 7-th Edition, Cambridge University Press, Cambridge, 1999.

(Continued)

*Primary Examiner*—Hwa (Andrew) Lee
*Assistant Examiner*—Michael A. Lyons
(74) *Attorney, Agent, or Firm*—Goodwin Procter LLP

(57) ABSTRACT

An improved band pass interferometer for use as a high resolution wavelength selection unit comprising, as main elements, an input optical port (optical fiber) together with a fiber optic collimator for generating a narrow incoming collimated beam, two plane-parallel highly reflective surfaces with low reflection losses, one being totally reflective, (i.e. very little intensity of the light beam incident thereon should pass through the reflective surface,) the other being partially reflective, (i.e., a portion of a reflected light beam, more specifically its intensity, incident thereon should pass through the partially reflective surface becoming an output beam,) which splits the incoming narrow incoming collimated beam into a finite number of output beams, an optical medium located between the reflective surfaces, and a beam focusing element which collects all the output beams and focuses them into an output optical port (optical fiber). There is also provided a refractive index adjuster, such as, e.g., an electro-optical element, that changes the refractive index of the optical medium between the reflective surfaces using, preferably, an electro-optical control voltage. There is further provided an adjustable spacer, such as, e.g., a piezoelectrical element, that changes the spacing between the reflective surfaces using, preferably, a piezo-electric control voltage. The coherent beam emerging from the input port is collimated and is sent to two parallel reflective surfaces, one totally reflective, the other partially reflective, generating in this way a finite number of output beams, which are collected and focused into a focused spot by a converging element, usually a lens system. At the recombination point, which is the entrance aperture into the output optical port, all the multiple beams generated by the two mirrors setup, interfere. The output beam resulting from the interference of those multiple output beams is available as the output beam of the device. The transmission function, which is the ratio between the intensity available at the output port versus the intensity at the input port, strongly depends on the phase shift introduced between the multiple output beams by the beam-splitting element, realized with the two mirrors. The tuning principle of the said interferometer is to select only one wavelength at its output by changing either the spacing between the mirrors using the Piezo-electric control voltage or the refractive index of the media between them using the electro-optical control voltage, which leads to a shifting of the transmission maximum into a broad wavelength range, keeping also very good insertion loss or transmission efficiency for the selected wavelength and a constant bandwidth in the whole working range.

44 Claims, 8 Drawing Sheets

U.S. PATENT DOCUMENTS

| | | | |
|---|---|---|---|
| 3,758,194 A * | 9/1973 | Daval et al. | 356/519 |
| 4,976,513 A | 12/1990 | Numai | |
| 5,073,004 A | 12/1991 | Clayton et al. | |
| 5,150,236 A | 9/1992 | Patel | |
| 5,173,908 A | 12/1992 | Negus et al. | |
| 5,212,584 A | 5/1993 | Chung | |
| 5,357,340 A * | 10/1994 | Zochbauer | 356/454 |
| 5,359,760 A * | 11/1994 | Busse et al. | 29/25.35 |
| 5,361,155 A | 11/1994 | Chiaroni et al. | |
| 5,557,468 A | 9/1996 | Ip | |
| 5,710,655 A | 1/1998 | Rumbaugh et al. | |
| 5,739,945 A | 4/1998 | Tayebati | |
| 5,917,626 A | 6/1999 | Lee | |
| 6,608,721 B1 * | 8/2003 | Turpin et al. | 359/577 |

OTHER PUBLICATIONS

A.G. Fox and T. Li, in "Resonant Modes in a Master Interferometer," "The Bell System Technical Journal", pp. 453-488, Mar. 1961.

G.D. Boyd and K. Kogelnik, in "Generalized Confocal Resonator Theory", "The Bell System Technical Journal", pp. 1347-1369, Jul. 1962.

N. Chitica et. al., "Monolithic InP-based Tunable Filter with 10-nm bandwidth for Optical data Interconnects in the 1550-nm Band," IEEE Photonics Technology Letters, vol. 11, No. 5, pp. 584-586, May 1999.

A. Spisser et. al., "Highly Selective and Widely Tunable 1.55-$\mu$m InP/Air-Gap Micromachined Fabry-Perot Filter for Optical Communications," IEEE Photonics Technology Letters, vol. 10, pp. 1259-1261, Sep. 1998.

P. Tayebati, et al., "Microelectromechanical Tunable Filter With Stable Half Symmetric Cavity," Electronics Letters, vol. 34 (1998), No. 20, pp. 1967-1968.

D. Vakhshoori, et al., "2mW CW Singlemode Operation of a Tunable 1550nm Vertical Cavity Surface Emitting Laser With 50nm Tuning Range," "Electronics Letters", vol. 35 (1999), No. 11, pp. 900-901.

K. Hirabayashi et al, "Tunable Liquid-Crystal Fabry-Perot Interference Filter for Wavelength-Division Multiplexing Communication Systems," "Journal of Lightwave Technology", vol. 11, No. 12, pp. 2033-2043, Dec. 1993.

* cited by examiner

--PRIOR ART-- a)  $d_4=13.614\mu m$; $\theta=1.0°$, $r_1=0.995$, $a_1=0.004$, $r_2=0.985$, $a_2=0.004$ b)  $d_4=13.614\mu m$; $\theta=1.0°$, $r_1=0.995$, $a1=0.004$, $r_2=0.930$, $a_2=0.004$ c)  $d_4=13.614\mu m$, $\theta=1.0°$, $r_1=0.995$, $a_1=0.004$, $r_2=0.830$, $a_2=0.004$ a)  $d_8$=11.850244mm, $\theta$=1.0°, $r_1$=0.995, $a_1$=0.004, $r_2$=0.970, $a_2$=0.004 b)  $d_8$=11.850244mm, $\theta$=1.0°, $r_1$=0.995, $a_1$=0.004, $r_2$=0.930, $a_2$=0.004 c)  $d_8$=11.850244mm, $\theta$=1.0°, $r_1$=0.995, $a_1$=0.004, $r_2$=0.830, $a_2$=0.004

BAND PASS INTERFEROMETER WITH TUNING CAPABILITIES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE OF A "MICROFICHE APPENDIX"

Not Applicable

BACKGROUND

1. Field of Invention

This invention relates to wavelength selection devices and more particularly to an improved band pass interferometer, which, among other things, has a defined passband, has polarization insensitivity, has low insertion loss, is reliable and is cost effective. In at least one of several preferred embodiments, the improved interferometer is also tunable.

2. Brief Description of the Prior Art

Optical communications system have been proliferating rapidly because of their high bandwidth, made available by the carrier frequency, in the hundreds of THz range, which corresponds to (0.9 ... 1.6) $\mu$m wavelength range. (Throughout the description of this invention, either wavelength or frequency will be interchangeably used, depending on the context.) Optical fibers and optical amplifiers have a passband of at least 30 nm, which allow simultaneous work of many carriers having different wavelengths. The problem in this case is to generate each carrier with its specific wavelength at the source side and to select only one carrier (wavelength) at a time per communication channel at the receiver side. A key element of the communication channel is a filter with a narrow passband, low attenuation in the passband, sharp edges and high attenuation in the rejection or stop bands. Fixed-frequency filters with such characteristics exist, but their use in DWDM systems also require the use of multiplexers to combine multiple wavelengths (channels) into the same fiber and demultiplexers to extract the individual wavelengths from a multitude of wavelengths carried by an optical fiber. The multiplexer/demultiplexer introduces additional power losses and adds overall complexity to the system. A tunable filter could simplify wavelength selection in a communication system and could give flexibility by allowing fast and random frequency selection per channel.

Fabry-Perot interferometers are widely used as narrow-band, tunable elements in tunable filters. The basic configuration of a conventional Fabry-Perot interferometer is schematically shown in FIG. 1 and is also disclosed in the well-known publication, M. Born, E. Wolf, "*Principles of Optics*", Chapter 7.6, pp. 359–409, 7-th Edition, Cambridge University Press, Cambridge, 1999. The Fabry-Perot interferometer consists basically of two transparent plates (substrates) with parallel and flat surfaces 101 and 102 facing each other, one surface covered with a highly reflective layer 103 having a reflection coefficient $r_1$, and the other surface covered with a highly reflective layer 104 having a reflection coefficient $r_2$. An incoming beam 105, wide enough to cover the aperture of the two reflective layers 103 and 104, and propagating within a medium having a refractive index $n_1$, (which is usually the air), is incident on the plate 101 under the incidence angle $\theta$. Fabry-Perot interferometers usually have highly reflective layers $r_1 \approx r_2$ and small, but not zero incidence angle $\theta \approx 0$. The reflective layer 103 splits the incident beam 105 into the reflected beam 107 and the transmitted beam 106, which will propagate in the medium 108 with a refractive index $n_2$. The optical medium 108 completely fills the gap between the reflective layers 103 and 104. Only the rays transmitted through the reflective layer 103 are important for the transmission properties of the Fabry-Perot interferometer and will be further considered. The reflected beam 107 will also be ignored. Each ray of the transmitted beam 106 propagating in the medium 108, bounces many times between the reflective layers 103 and 104. FIG. 1 shows only one ray of the beam 105, without restricting the generality. This ray hits the layer 103 in A1, A2, A3, A4, A5, ... and the layer 104 in B1, B2, B3, B4, B5, ... For a small incidence angle $\theta \approx 0$, there is an infinite number of reflections of the transmitted beam 106 on the reflective layers 103 and 104. All the parallel rays transmitted through the layer 104 belong to the transmitted beam 109, which covers a large area of the reflective layer 104. The transmitted beam 109 contains parallel rays coming from the incident beam 105 and also from a different number of reflections between the reflective layers 103 and 104, from zero, which is the direct transmission, to a very large number, which is the finesse of the interferometer. All of these rays interfere between them and generate fringes in the far field. The fringes are parallel and equidistant lines, all of them being also parallel with the straight line generated by the intersection between the incident beam 105 and the first reflective layer 103. A lens 110 focuses the fringes on a screen 111, up to a single line 112. For a given wavelength $\lambda$, the resulting field in 112 produces either a maximum or a minimum of interference depending on the incidence angle $\theta$, the spacing d between the reflective layers 103 and 104, and of the refractive index $n_2$ of the media 108. The contribution of the refractive index and of the thickness of the plates 101 and 102 are ignored for the purpose of this explanation, because they are constant. For a constant wavelength $\lambda$, the beam intensity on the line 112 can be controlled either by changing the spacing d or by changing the refractive index $n_2$ of the media between the plates 101 and 102, but this case does not have any interest for the present patent. If the intensity of the incident beam is denoted $I_1$ and the intensity of the resulting beam 112 is denoted $I_2$, then the transmission function of the Fabry-Perot interferometer is denoted $T=I_2/I_1$. For constant values of the incidence angle $\theta$, of the plate spacing d and of the refractive index $n_2$, the transmission T is a function of wavelength $T(\lambda)$ and the Fabry-Perot interferometer has wavelength selective properties. Its wavelength selectivity increases with the number of reflections on the reflective layers 103 and 104, parameter usually expressed as finesse. Higher values of $r_1$ and $r_2$ (higher finesse) means better wavelength selection, but these values also decrease the maximum transmission. At normal incidence $\theta=0$, the Fabry-Perot interferometer becomes a resonant cavity with eigenmodes and the transmission function $T(\lambda)$ has only discrete values. This case was very well analyzed by A. G. Fox and T. Li, in "*Resonant Modes in a Maser Interferometer*" published in "*The Bell System Technical Journal*", pp. 453–488, March 1961 and G. D. Boyd and K. Kogelnik, in "*Generalized Confocal Resonator Theory*", published in "*The Bell System Technical Journal*", pp. 1347–1369, July 1962. A continuous tunability T(λ) of the Fabry-Perot interferometer cannot be achieved for a wide wavelength range.

Many patents disclose Fabry-Perot interferometers of various forms. For example, U.S. Pat. No. 5,361,155 discloses a tunable filter realized by changing the incidence angle into the Fabry-Perot interferometer. The input beam comes from an input monomode optical fiber and is collimated by a lens, onto a Fabry-Perot interferometer. A lens focuses the output beam from the interferometer onto an output monomode optical fiber. There is a unique relation between the incidence angle into the Fabry-Perot interferometer and the center wavelength of the transmission peak. A rotating plate with flat-parallel faces compensates the output beam displacement, to keep the beam in the pupil of the receiving optical fiber. The main drawback of this approach is that the bandwidth depends on the incidence angle to Fabry-Perot filter, i.e. the bandwidth is not constant in the tuning range of the filter.

In the U.S. Pat. No. 5,917,626, the light beam is focused on the interference filter using a GRIN lens. Changing the incidence point to the entrance into the GRIN lens changes the angle of incidence to an interference filter. The incidence angle is adjusted by rotating the plate or substrate into a collimated light beam. The approach of selecting the wavelength by changing the incidence angle to an interference filter has the advantage of tunability over the whole wavelength range required by DWDM applications, but has also two major drawbacks: variable bandpass in the working range and polarization dependence, especially when the incidence angle is greater than few degrees.

U.S. Pat. No. 5,710,655 claims the use of the dependence of the refractive index of a liquid crystal to the applied voltage to tune the interferometer. The gap of a Fabry-Perot interferometer contains a voltage-controlled liquid crystal cell. The refractive index of the liquid crystal is voltage-dependent, which makes the interferometer tunable into a certain range. For those knowledgeable in the field, it is obvious that the patent ignores the changes in the beam polarization induced by the liquid crystal, which affects the interference of the output beams and makes the device polarization-sensitive.

U.S. Pat. No. 5,073,004 uses a Fabry-Perot interferometer built at the ends of two ferrules having the mirrors embedded in their volume. Wavelength selection is done by adjusting the gap between the mirrors. However, comments about the tuning range, transmission and bandwidth in the passband, and diffraction losses are not disclosed and accordingly are left up to speculation.

U.S. Pat. No. 5,739,945 shows a low-order, integrated Fabry-Perot interferometer used as the main element of an optical filter. The transfer function has many peaks in the working range of the filter, but there is no mention about the free spectral range (FSR), the transmission value and the bandwidth in the passband.

U.S. Pat. No. 4,976,513 describes another integrated Fabry-Perot interferometer, having distributed feedback Bragg (DFB) reflectors as mirrors. The frequency of the cavity is adjusted by the injection current into a phase-control section, located between the DFB reflectors. Because of the geometry built into a waveguide, the Fabry-Perot interferometer is very low-order and has a large FSR. While the center wavelength range is acceptable for DWDM applications, the slopes of the transfer functions are unfortunately very mild.

U.S. Pat. No. 5,212,584 discloses a Fabry-Perot interferometer as a wavelength selective device. Here, the interferometer is built into the volume of a transparent plate with plane-parallel surfaces, covered with reflective multiple coatings. The author claims wavelength selection by changing the incidence angle on the plate. Wavelength locking is achieved by changing the refractive index of the plate. The author considers that the changes to the plate thickness with temperature produce negligible effects on tunability, when compared with the changes of the refractive index induced by temperature. The tuning range and the passband reported are acceptable for DWDM applications. However, the limitation with this approach comes from the tuning speed.

Other approaches to implementing tunable optical filters are disclosed in several publications. For example, Fabry-Perot tunable filters with plane mirrors made in microelectromechanical (MEM) technology are disclosed in the papers N. Chitica et. al., "*Monolithic InP-based Tunable Filter with 10-nm bandwidth for Optical data Interconnects in the 1550-nm Band*", IEEE Photonics Technology Letters, vol. 11, No. 5, pp. 584–586, May 1999; and A. Spisser et. al., "*Highly Selective and Widely Tunable 1.55-μm InP/Air-Gap Micromachined Fabry-Perot Filter for Optical Communications*", IEEE Photonics Technology Letters", vol. 10, pp. 1259–1261, September 1998. However, these filters have some important drawbacks: low tuning range, wide passband because of their low-order mode of operation, high diffraction losses because of the poor optical quality of the mirrors or Bragg reflectors and difficulties in connecting with optical fibers.

In another implementation of a tunable Fabry-Perot resonators using MEM technology, as disclosed in P. Tayebatti, et al., "*Microelectromechanical Tunable Filter With Stable Half Symmetric Cavity*", Electronics Letters, vol. 34 (1998), No. 20, pp. 1967–1968, the plane mirror of the cavity is fixed on the substrate and the spherical mirror of the cavity moves on top of it driven by a control voltage, to tune the interferometer. The filter has a single transmission peak about 0.8 nm wide at −30 dB in the whole working range of 40 nm. An input optical fiber coupled with a lens sends the beam into the Fabry-Perot interferometer and the output beam from the interferometer is collected by an output fiber. The collimated beam at the entrance of the Fabry-Perot interferometer minimizes the high-order modes of the cavity. The major drawback using MEM technology to build the Fabry-Perot interferometer is the open loop operation, which makes impossible an accurate control of the displacement and of the position of the spherical mirror, and implicitly a bad control of the transmission characteristic.

D. Vakhshoori, et al., "*2 mW CW Singlemode Operation of a Tunable 1550 nm Vertical Cavity Surface Emitting Laser With 50 nm Tuning Range*", appeared in "*Electronics Letters*", vol. 35 (1999), No. 11, pp. 900–901, describe another application of the voltage tunable Fabry-Perot interferometer in MEM technology, for tuning a Vertical Cavity Surface Emitting Laser (VCSEL). The tunable VCSEL has the same drawbacks as the tunable filter described previously. Though the half symmetric cavity has the maximum mechanical stability among all the configuration of Fabry-Perot interferometers, this advantage cannot compensate the disadvantages of the open-loop operation of MEM technology.

In other publications, very low-order Fabry-Perot interferometers having the gap filled with liquid crystals are disclosed. See, K. Hirabayashi et al. "*Tunable Liquid-Crystal Fabry-Perot Interference Filter for Wavelength-Division Multiplexing Communication Systems*", published in "*Journal of Lightwave Technology*", vol. 11, No. 12, pp. 2033–2043, December 1993. This approach has some major drawbacks: mild slopes between the bandpass and the rejection bands when covering the spectral range for DWDM applications and strong polarization dependence.

Other known methods used to implement a tunable filter, include: Bragg diffraction grating generated by an ultrasound wave, Mach-Zehnder interferometer, fiber-optic interferometer with Bragg reflectors, wavelength-selective properties of some cascaded elements such as a polarizer, an electro-optical birefringent element and an analyzer. While each have their own desirable characteristics, none provide for the required insertion loss in the passband, attenuation in the rejection bands, or the required slope of the transfer characteristic between the transmission band and the rejection bands.

Accordingly, there is a need for a solution that addresses the problems of the prior art.

SUMMARY OF THE INVENTION

The present invention is directed to solving the forgoing needs. Specifically, it is a general object of the present invention to provide a wavelength-selective optical setup that achieves wavelength selection by changing at least one parameter of the optical setup and which will be further used to build a variety of high-performance tunable optical filters.

It is a further object of the present invention to provide an interference filter used as a tunable optical device, with one input narrow beam and with multiple output narrow beams, all the output beams being generated as a result of multiple reflections with negligible diffraction losses of the input narrow beam between two reflective surfaces inside the filter, all the output beams being further collected by a lens or by any other means into a very narrow region in space, ideally into a focused spot.

It is also an object of this invention to make the filter tunable by external means to change the phase shift of the light beam in each and every pass of the beam between two successive internal reflections, the external control mean changing simultaneously the phase shift of each and every output beam the thus maximizing the control efficiency.

It is a further object of the present invention to make the filter free of eigenmodes, characteristic to any resonant cavity, and to provide it with a continuous tunability in the whole working range.

It is also an object of the present invention to minimize the insertion loss in the passband of the filter and to maximize the losses in the rejection bands.

It is a further object of the present invention to make a constant-width passband of the filter in its whole operating range, with constant insertion loss in the passband, i.e. to keep constant its instrumental width and insertion loss in the whole tuning range.

It is also an object of this invention to make the filter cascadable either with the same type of filters as described in the present invention or with other type of filters or optical devices, to improve further wavelength selection properties and signal-to-noise ratio with respect to the unwanted frequency components.

It is a further object of the present invention to make the filter insensitive to small opto-mechanical misalignment that can occur during its normal operation.

It is also an object of the present invention to make the filter to operate into a closed loop, monitored by a controller.

It is a further object of the present invention to make a tunable optical filter easy to manufacture and to align.

It is also an object of the present invention to make a tunable optical filter rugged, with a reliable operation into a broad range of environmental conditions.

Therefore, in accordance with one aspect of the present invention there is provided a preferred embodiment of an improved band pass interferometer comprising, as main elements, an input optical port (optical fiber) together with a fiber optic collimator for generating a narrow incoming collimated beam; two plane-parallel highly reflective surfaces with low reflection losses, one being totally reflective, (i.e. very little intensity of the light beam incident thereon should pass through the reflective surface,) the other being partially reflective, (i.e., a portion of a reflected light beam, more specifically its intensity, incident thereon should pass through the partially reflective surface becoming an output beam,) which splits the incoming narrow collimated beam into a finite number of output beams; an optical medium located between the reflective surfaces; and a beam focusing element which collects all the output beams and focuses them into an output optical port (optical fiber).

In accordance with a second aspect of the present invention there is provided a tunable multi-beam interferometer, also called band pass interferometer with tuning capabilities, further comprising, a refractive index adjuster, such as, e.g., an electro-optical element, that changes the refractive index of the optical medium between the reflective surfaces using, preferably, an electro-optical control voltage.

In accordance with a third aspect of the present invention there is provided a preferred embodiment of a band pass interferometer with tuning capabilities further comprising an adjustable spacer, such as, e.g., a piezo-electrical element, that changes the spacing between the reflective surfaces using, preferably, a piezo-electric control voltage.

In accordance with a fourth aspect of the present invention there is provided a controller, which along with the aid of a displacement sensor, monitors the operation of the interferometer, especially the adjustable spacing between the reflectors (reflective layers 203 and 204) thereby providing a closed loop system.

In accordance with a fifth aspect of the present invention the incoming collimated narrow beam is incident at a small angle, but not zero, on the totally reflective surface. Thereafter, the first light beam which is reflected by the totally reflective surface propagates to the first incident point on the partially reflective surface. At this point, part of the reflected beam's intensity passes through the partially reflective surface and is available at the output of the interferometer as the first output beam. Most of the beam intensity incident on the partially reflective surface is reflected back to the totally reflected surface and the process continues many times in the same way. The number of successive reflections between the two reflective surfaces depends on the incidence angle of the input beam on the totally reflective surface, on the size of the two reflectors and on the transmission coefficient of the partially reflective surface. At each reflection point on the partially reflective surface, an output beam is generated at the output of the interferometer along with a reflected beam. The intensity of the reflected beam becomes smaller. Even if the number of internal reflections is very high, after a certain number of such reflections, the intensity of further reflected beams and its corresponding output beams becomes insignificantly smaller compared to the intensity of the first output beam. Accordingly, the contribution of these beams, reflected many times, to the total interference pattern produced by all the output beams becomes insignificant. This decrease in intensity introduces a practical limit in the number of internal reflections, to a reasonable value (20 to 50). The output beams have decreasing intensities because of the finite transmission through the partial reflective surface and they have their relative phases very well defined by the optical path differences (OPD). The OPD of each output beam is an even multiple of an elementary optical path difference (EOPD). The EOPD depends on: the spacing between the reflective surfaces, the incidence angle of the input beam and the refractive index of the optical medium between the reflective surfaces. Changing any of these parameters can control the OPD.

In accordance with a sixth aspect of the present invention, the setup comprising the two plane parallel reflective surfaces does not constitute a resonant cavity for the input beam and instead enables a narrow and collimated input beam incident at a non-zero angle on the totally reflective surface to split into multiple output beams having very well controlled amplitudes and phase relationships.

In accordance with a seventh aspect of the present invention, a collecting medium guides all the output beams into a focused spot, preferably the entrance aperture of an optical fiber, in order to generate multiple interference between the output beams. The output optical fiber is the output port of the filter. Most of the energy of the incoming beam contained in a specific wavelength is available at the output port of the filter. The losses at a specific wavelength depends on the absorption losses at 1) the input port, 2) the reflective surfaces, 3) by the collecting medium and 4) by the coupling between the collecting medium and the output port. The beam delivered at the output port can be further used for any kind of processing, either by an optical filter of the same type as is described in this invention, or by another type of optical filter, or by any other optical device as an optical switch, an optical coupler, an optical taper, or by using a photodetection circuit followed by an electronic processing system.

These and other aspects, features, objects and advantages of the present invention will become better understood with regard to the following description, appended claims, and accompanying drawings.

BRIEF DESCRIPTION OF THE DRAWINGS

Turning to the drawings.

DETAILED DESCRIPTION OF THE INVENTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. The leading digit(s) of the reference numbers in the Figures usually correspond to the figure number, with the exception that identical components which appear in multiple figures are identified by the same reference numbers.

One purpose of the present invention is to provide a core wavelength selection device that can be used in DWDM applications according to existing and future telecommunication standards, as well as can be used in other applications, e.g., optical spectrum analyzers.

A. Configuration

Figure 1:
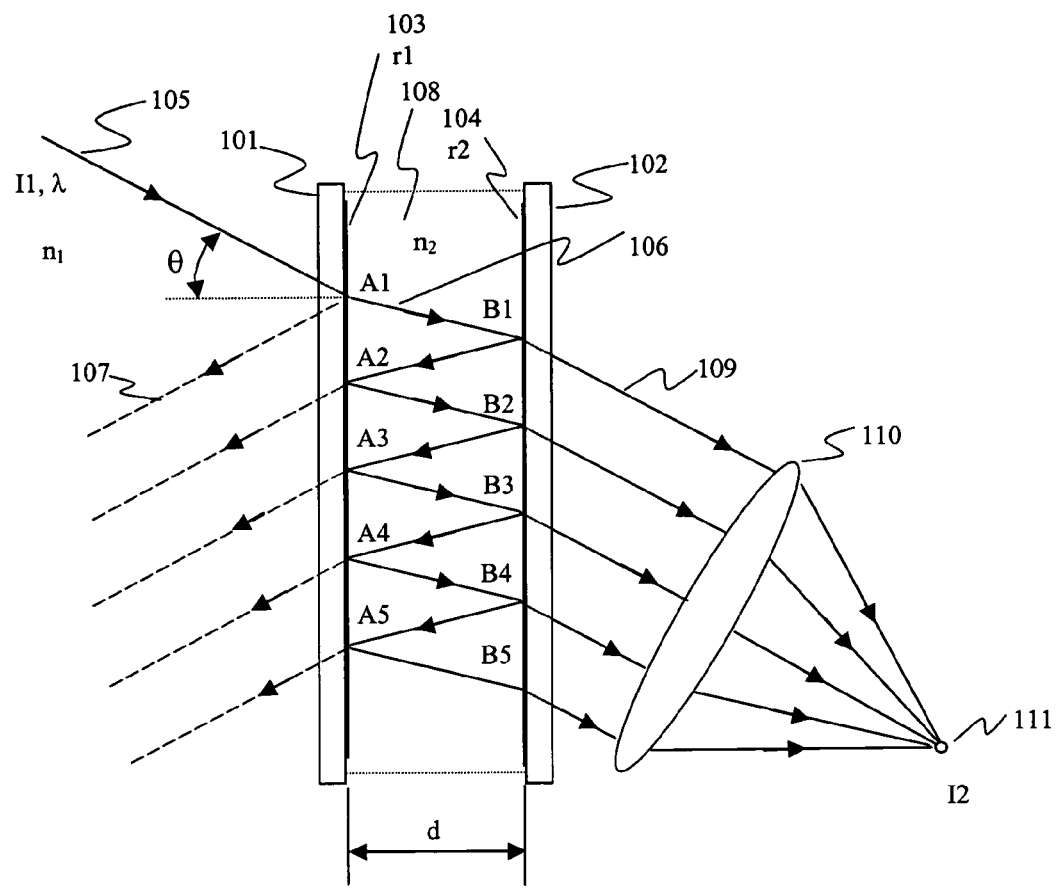
FIG. 1 is a schematic drawing of a conventional Fabry-Perot interferometer widely known and used in the art.
Figure 2A:
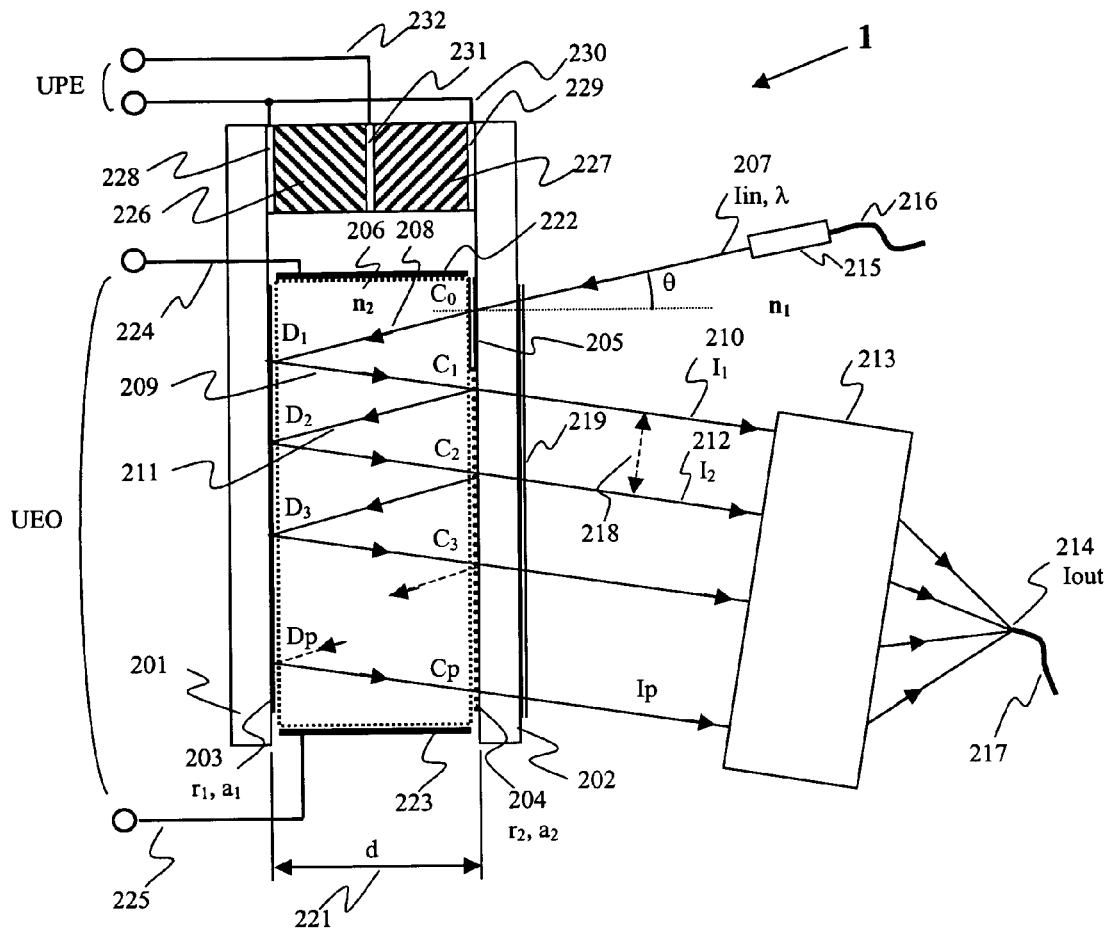
FIG. 2A is a schematic drawing of a first embodiment of an interferometer, constructed in accordance with the teachings of the present invention.
Figure 2B:
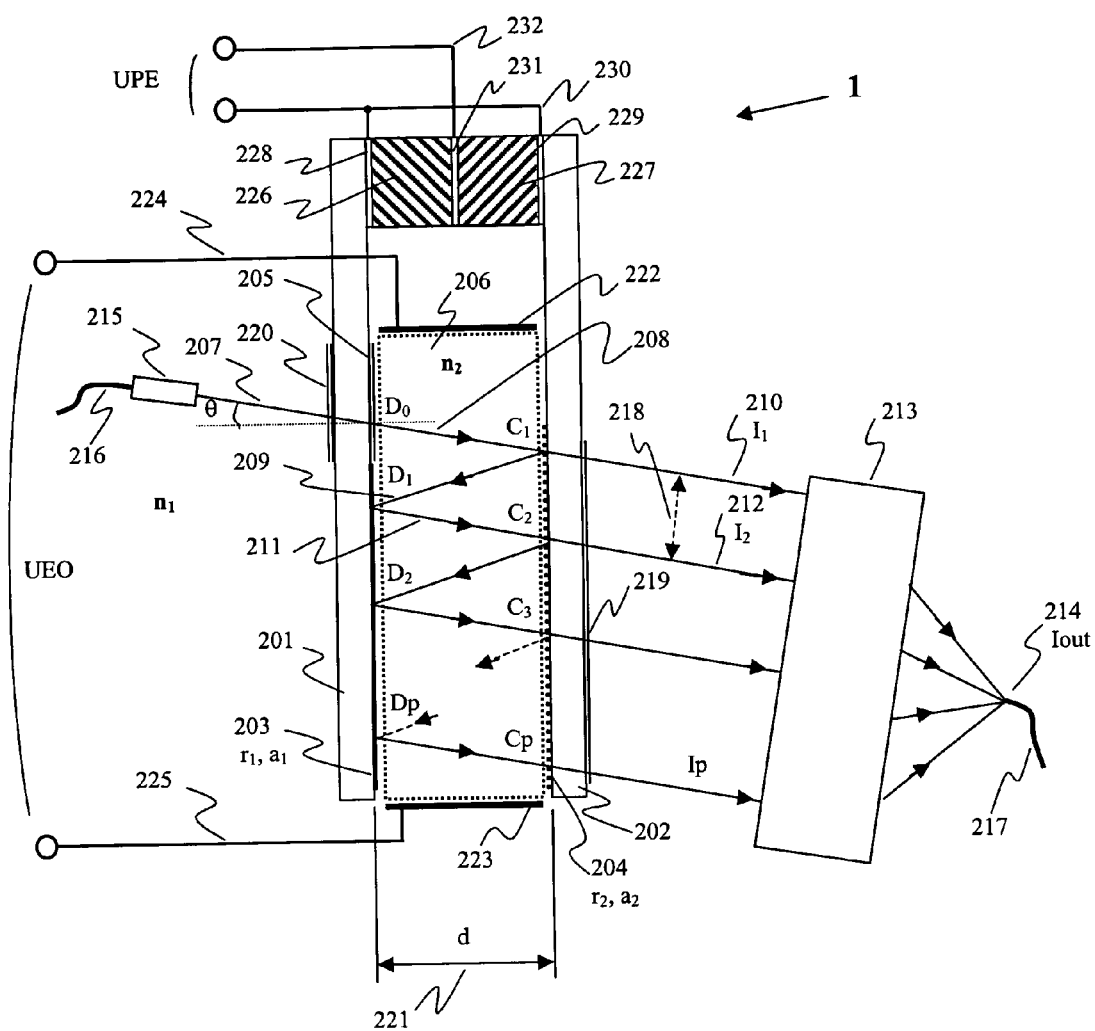
FIG. 2B is a schematic drawing of a second embodiment of an interferometer constructed in accordance with the teachings of the present invention.

FIG. 2A and FIG. 2B show two embodiments of an interferometer 1 constructed and operating in accordance with the present invention. While the practical implementation of the forgoing embodiments may differ from application to application, the basic ideas underlying the two are the same.

In its most basic embodiment, the interferometer 1 need not be tunable. However, tunability of the interferometer 1 is a desired and important feature and will be considered in the following description.

Referring to FIG. 2A, there is shown a schematic diagram of one embodiment of the present invention designated generally by the numeral 1. As shown, the interferometer 1 is adapted to have input and output beams on the same side of the interferometer, i.e., it is a single-sided interferometer. The interferometer comprises two transparent optical plates 201 and 202, positioned in parallel relationship so as to present facing sides to each other. Both of the plates 201 and 202 have flat surfaces. The plate 201 has a flat near total to totally reflective layer, coating or medium 203 with a reflection coefficient $r_1$ and an absorption coefficient $a_1$, on the side facing the plate 202. Here, as well as elsewhere herein, the expression "near total" or "totally reflective"

means that very little or no part of a beam's intensity will pass through the reflective layer 203, when said beam is incident on the reflective layer 203. The plate 202 has a flat partially reflective layer, coating or medium 204 having a reflection coefficient $r_2$, an absorption coefficient $a_2$ and a transmission-optimized optical layer, coating or medium 205, optimized for maximum transmission of an input beam(s), on the side facing the plate 201. Here, as well as elsewhere herein, the expression "partially reflective" means that a portion of a reflective light beam 208, that is, its intensity, incident on reflective layer 204 passes through it becoming an output beam 210. The plate 202 also has a transmission-optimized optical layer, coating or medium 219, optimized for maximum transmission of output beam(s), on the side (opposite to) not facing the plate 201, where the output beams are coming out of the interferometer.

Electro-optical medium 206 is positioned between the flat parallel reflective layers 203 and 204. Electro-optical medium 206 is highly transparent, having an acceptable level of optical non-homogeneities, and an electro-optic refractive index $n_2$ in the direction of propagating beams.

In a preferred embodiment, the electro-optical medium 206 has two electrodes 222 and 223, connected to terminals 224 and 225, respectively. This configuration is well-known in the art as it is typical set-up in any electro-optical crystal used in laser applications. An electro-optical control voltage UEO is applied between the terminals 224 and 225 in order to adjust the refractive index $n_2$ of electro-optical medium 206 and, by consequence, the EOPD.

In a preferred embodiment of the present invention, an adjustable spacer is located between the optical plates 201 and 202. The selected adjustable spacer medium adjusts the spacing between optical plates 201 and 202 while maintaining their parallel relationship with each other, Accordingly, one preferred choice for the adjustable spacer is a conventional high-accuracy piezo-ceramic actuator. As known in the art, the piezo-ceramic actuator typically comprises ceramics 226 and 227, electrodes 228 and 229 connected to a terminal 230, and electrode 231 connected to a terminal 232. A control voltage, such as a piezo-electric control voltage UPE, is applied to and between the terminals 230 and 232, in order to adjust the spacing d between the reflective layers 203 and 204 and by consequence the EOPD.

In another embodiment of interferometer 1, a controller (not shown), such as e.g., a computer, and a displacement sensor (also not shown), monitors and measures the gap between the reflectors (reflective layers 203 and 204) thereby providing a closed loop system.

Referring to FIG. 2B, there is shown schematically another embodiment of the present invention designated generally by the numeral 1. The only difference between this embodiment and the embodiment in FIG. 2A is that this embodiment of the interferometer 1 is adapted to have input and output beams on opposite sides of the interferometer, i.e., it is a two-sided interferometer.

Everything else being the same and as shown in FIG. 2B, the plate 201 has on the side facing the plate 202, a totally reflective layer, coating or medium 203 with a reflection coefficient $r_1$ and an absorption coefficient $a_1$ and an transmission-optimized optical layer or port 205, optimized for maximum transmission of an input beam(s). The plate 201 has another transmission-optimized optical layer or port 220, optimized for maximum transmission of an input beam(s), on the side not facing plate 202.

The plate 202 has a partially reflective layer, coating or medium 204 having a reflection coefficient $r_2$ and an absorption coefficient $a_2$ on the side facing the plate 201. The plate 202 also has an optical output layer or port 219 optimized for maximum transmission of an output beam(s), on the face opposing the plate 201.

B. Method of Operation

For illustrative purposes only and bearing in the mind that the following should not be deemed as limiting, the overall operation of the present invention will now be described with reference to the exemplary embodiment shown in FIG. 2A.

An input optical fiber 216 provides a beam which passes through a fiber optic collimator 215 to generate a collimated input beam 207. The collimated input beam 207, having an intensity $I_{in}$ and a wavelength $\lambda$, is incident in/at the point $C_0$ of the optical layer or port 205, under the incidence angle $\theta$. Point $C_0$ is located at the interface between the plate 202 and the optical medium 206, the medium 206 filling the space between 203 and 204. The input beam 207 continues to propagate in the optical medium 206, and becomes beam 208. The beam 208 is reflected at point D1 by the totally reflective layer 203 and, after this reflection, becomes beam 209 with the intensity $r_1 * I_{in}$. Remaining in the optical medium 206, beam 209 moves towards the partially reflective layer 204. The beam 209 is incident on the partially reflective layer 204 at point $C_1$. At point C1, part of the beam 209 passes through the partially reflective layer 204 and becomes output beam 210 with the intensity $I_1=(1-r_2-a_2) * r_1 * I_{in}$. Another part of the beam 209 is reflected by the partially reflective layer 204 and becomes beam 211 with the intensity $r_1 * r_2 * I_{in}$. The beam 211 and so on propagates inside optical medium 206 and is further reflected between the reflective layers 203 and 204 as previously described.

Generally, the number of reflection points, i.e., $C_1, C_2, \ldots$ Cp and $D_1, D_2, \ldots$ Dp that ultimately exists is determined by the incidence angle $\theta$, the value of d 221 and the dimensions/size of the reflective layers 203 and 204. At each reflection point $C_1, C_2, \ldots$ Cp on the partially reflective layer 204 and at each reflection point $D_1, D_2, \ldots$ Dp on the totally reflective layer 203, the intensity of the beam propagating inside the optical medium 206 decreases in geometric regression. Consequently, the intensities $I_1, I_2, \ldots$ Ip of the output beams 210, 212, . . . also decreases in comparable geometric regression.

The input beam with intensity $I_{in}$ and the output beams with intensities $I_1, I_2 \ldots$ Ip are coherent, with the intensities of the output beams $I_1, I_2, \ldots$ Ip substantially keeping the same polarization as the intensity of the input beam $I_{in}$. For a small incidence angle $\theta$, say on the order of a few degrees, the reflection coefficients $r_1$ and $r_2$ are independent of the polarization state of the input beam 207. This makes the interferometer 1 according to the present invention insensitive to polarization.

Considering the phase of the beam 210 at the point $C_1$ as the phase reference for all the output beams 210, 212, . . . having intensities $I_1, I_2, \ldots I_p$, each of the output beams will have its phase delayed by its neighbors with an elementary phase shift $\phi(\lambda)$, corresponding to an EOPD (Elementary Optical Path Difference) formula:

$$\phi(\lambda)=(2 \cdot \pi \cdot d \cdot n_2) \cdot (\lambda \cdot \cos\theta)^{-1} \qquad (1)$$

Each reflection on the reflective layers 203 and 204 and each transmission through the layer 204 introduces a small amount of constant phase shift that does not influence the operation of the interferometer 1.

All the output beams 210, 212, . . . are collected by an element 213 into a very narrow region in space, ideally into a focused spot 214, where the beam intensity here is $I_{out}$. In a preferred embodiment of this invention, the multiple beams 210, 212 ... generated at the output of interferometer 1 are all collected and focused by the element 213 at the input aperture 214 of the output optical fiber 217. Preferably, the element 213 is any suitable lens system that can collect and focus the multiple output beams 210, 212 ... such as a spherical lens system, an aspherical lens system, a gradient-index (GRIN) lens system, or any combination of the foregoing.

The entrance aperture 214 of the optical fiber 217 also functions as a slit for the output of interferometer 1. That is, the size of the aperture 214 contributes to the instrumental bandwidth of the filter and at the same time contributes to the overall transmission efficiency of interferometer 1. The diffraction effects can be made negligible, by choosing the appropriate dimensions for the diameter of the input beam 207 and for the plates 201 and 202.

Considering that the input beam has no wavelength dependence, i.e., $I_{in}(\lambda)=I_{in}$=constant, within a wavelength range, the output beam $I_{out}(\lambda)$ will be wavelength-dependent because of the transmission function of the interferometer 1: $T(\lambda)=I_{out}(\lambda)/I_{in}$. This well known analytical transmission function $T(\lambda)$ has the same algorithm as disclosed in M. Born, E. Wolf, "*Principles of Optics*", Chapter 7.6, pp. 359–409, 7-th Edition, Cambridge University Press, Cambridge, 1999. Thus, unlike a classic Fabry-Perot interferometer (the prior art), the present invention has a very narrow input beam and very well separated output beams. Specifically, one preferred embodiment of the interferometer 1 has a very narrow collimated input beam 207, a reflective medium 203 which has a very high reflection coefficient, preferably a reflection coefficient approaching total reflectivity, and an input port 205 which is completely transparent with preferably no absorption and no reflection, under a non-zero incident angle θ.

In the embodiments of the present invention shown in FIG. 2A and in FIG. 2B, the analytical expression of T(λ) is:

$$T(\lambda)=(1-r_2-a_2)^2 \quad \{[(r_1 \cdot r_2)^{p+2} \cdot \cos(2 \cdot p \cdot \phi(\lambda))+1]^2 + [(r_1 \cdot r_2)^{p+2}+2 \cdot \sin(2 \cdot p \cdot \phi(\lambda))]^2\} \cdot [(r_1 \cdot r_2)^2+1-2 \cdot (r_1 \cdot r_2) \cdot \cos(\phi(\lambda))]^{-2} \quad (2)$$

Here, $T(\lambda)$ is a function of the elementary phase shift $\phi(\lambda)$, which also depends on the EOPD: $(d \cdot n_2)/(\lambda \cdot \cos\theta)$.

Figure 3:
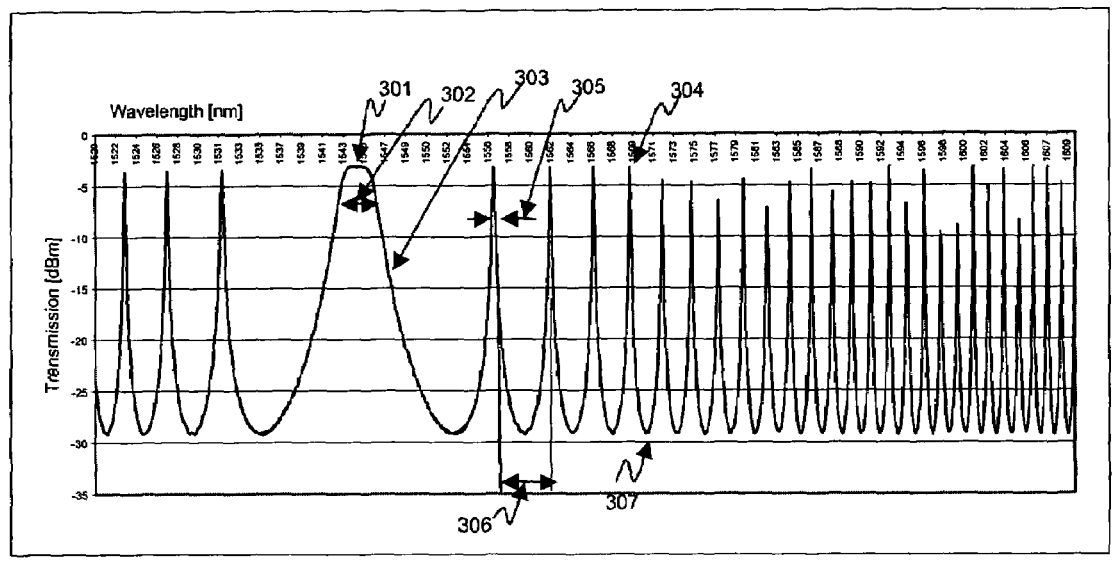
FIG. 3 is a plot diagram of the transmission versus wavelength characteristic of one embodiment of an interferometer constructed in accordance with the teachings of the present invention.

FIG. 3 is a plot diagram of a transmission versus wavelength characteristic of one embodiment of the interferometer 1 previously described in which the amount of transmission is along the vertical axis while the wavelength of the light is along the horizontal axis where d= 11.8902 mm, $n_2$=1.0, and θ=1.0 degrees. As shown in FIG. 3, $T(\lambda)$ has a main maximum 301, a number of secondary maxima 304 and a number of minima 307. Where the spacing between the plates 201 and 202 is d≈12 mm, there is always a main maximum 301 much wider than all the other secondary maxima 304. The present invention uses the main maximum 301 for/in tunability purposes. All secondary maxima 304 are considered spurious and are rejected.

As shown in FIG. 3, T(λ) dependency for wavelength range λ is from about 1530 nm to about 1610 nm. While, this range of values is of interest to DWDM applications (C-band and L-band), the present invention does not restrict its application to the forgoing range values. To the contrary, the present invention can be used in any wavelength range using the same hardware, as long as the reflective characteristics of the reflective layers 203 and 204 are in their optimum spectral range. If an optical signal with a uniformly distributed power spectrum is incident at the input port or layer 205, T(λ) represents the transmission spectrum of the interferometer 1 in the considered wavelength range.

By changing the values of either one of the parameters d, $n_2$, θ or any combination thereof, the position of maxima 301 and 304, and of the minima 307 also change, thereby making the interferometer 1 according to the present invention, a tunable optical device. A change in the value of d, $n_2$, or θ induces simultaneous changes in the EOPD of every output beam, and by consequence, it changes the transmission characteristic T(λ) of the interferometer. In other words, interferometer 1 amplifies the changes induced in every EOPD with the number of output beams. Thus, for all practical purposes and appreciated by those skilled in the art, only one parameter, either d, $n_2$ or θ, should be changed at any given instance in time in order to achieve desirable optical tunability. What follows is a general description of the tunable capabilities of the interferometer 1 of the present invention.

C. Tunability of the Interferometer 1

The interferometer 1 of the present invention can be tuned in the wavelength range of interest for, e.g., DWDM applications, by changing one or more of the following parameters: the incidence angle θ, the refractive index $n_2$ of the optical medium, or the spacing d between the reflective layers.

1. Adjusting the Incidence Angle

While the interferometer 1 of the present invention can be tuned by adjusting the incidence angle, changes to the incidence angle may create several problems for certain applications. Chief of these problems include: the position of the emerging beam points $C_2$, $C_3$, ... Cp change, the relative spacing 220 between the output beams change, and the width 302 of the main maximum 301 changes, too. These forgoing changes decrease the overall filtering properties of the interferometer 1. Changes in the position of the output beams and in their relative spacing may affect also the position of the focusing point 214 on the entrance aperture of the optical fiber 217, thus increasing the insertion loss of the interferometer 1 and even its transmission characteristic T(λ), by changing the instrumental width.

1. Adjusting the Refractive Index of the Optical Medium

Moreover, while the interferometer 1 of the present invention can be tuned by adjusting the refractive index $n_2$ of the optical medium, changes to the refractive index could also create several problems for certain applications. The optical media with electro-optical properties are bi-axial electro-optical crystals as KDP and liquid crystals as nematic liquid crystals. For the application according to the present invention, is essential that the electro-optic effect in any type of crystal must also keep unchanged the polarization of all the output beams 210, 212, ... in order to make all of them to interfere with maximum efficiency in the point 214. It is very well known for those skilled in the art that two light waves having crossed polarizations do not interfere. It is also very well known that if the polarization vectors have a non-zero angle, the interference efficiency is proportional with the squared cosine of that angle. The simplest way to keep the same polarization for all the output beams 210, 212 ... is to not change the polarization of the input beam 207 when generating all the output beams. There are some existing electro-optic crystals as KDP that can have a cut for which the linear electro-optic effect (Pockels effect) does not change the polarization state of the beam going through, but the electro-optical constant is so small, that the necessary voltage to produce the required wavelength tunability is in the order of few kilovolts for a technologically reasonable gap (few millimeters) between the reflective medium 203 and 204. Existing Liquid crystals (LC) such as nematic LC are very good candidates for the electro-optic medium 206, because their electro-optic constants are much higher than those of the electro-optic crystals, thus only few volts could be necessary to produce the same optical phase shift as an electro-optical crystal, in the same optical setup. However, the main drawback of the existing LC for the interferometer 1 constructed according to the present invention is that it strongly rotates the polarization plane of the beam going through and the multiple beams intersecting in 214 cannot interfere efficiently because of their different polarization states. And as will be described below, for DWDM tuning applications, two types of interferometers 1 constructed in accordance with the teachings herein are used: 1) a low-order interferometer 1 with a narrow gap 221 (in 13 μm range) and 2) a high-order interferometer 1 with a large gap 221 (in 12 mm range). Thus, for certain applications, existing LC's should not be used to fill the spacing 206 in the interferometer 1.

3. Adjusting the Spacing Between the Reflective Layers

The interferometer 1 of the present invention can also be tuned by adjusting the spacing between the two reflective layers. Adjusting the spacing between the two reflective layers is the preferable method for tuning the interferometer 1 as the problems associated with adjusting either the incidence angle or the refractive index are largely eliminated. Referring again to FIG. 3, the parameters of interest for the tuning analysis are shown. These include: the existence in the tuning range of a single main peak 301 with good transmission value or insertion loss generally better than 3 dB, the translation of the whole transmission characteristic mainly of the main peak 301 by keeping constant its width 302, within the wavelength range, the steep slopes 303 of the main peak, the secondary maxima amplitudes 304, secondary maxima widths 305, separation between maxima 306 and transmission minima 307.

What now follows describes the results achieved by tuning exemplary embodiments of a low-order and a high order interferometer 1 by adjusting the pacing between the two reflective surfaces. Note: the range of values for the spacing d for low-order and high-order interferometers may change if tuning needs to be made in different spectral regions, i.e. 1550 nm, 1310 nm, 980 nm, 830 nm or in any other spectral region.

Figure 4:
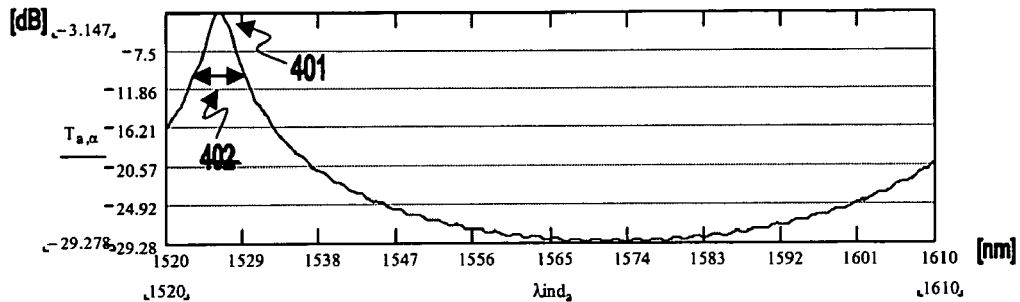
FIG. 4A, FIG. 4B and FIG. 4C are each plot diagrams of the transmission versus wavelength characteristic of one embodiment of a low-order interferometer constructed and operating in accordance with the teachings of the present invention, for three different values of the spacing d between the reflective layers, all the other parameters being unchanged.
Figure 4:
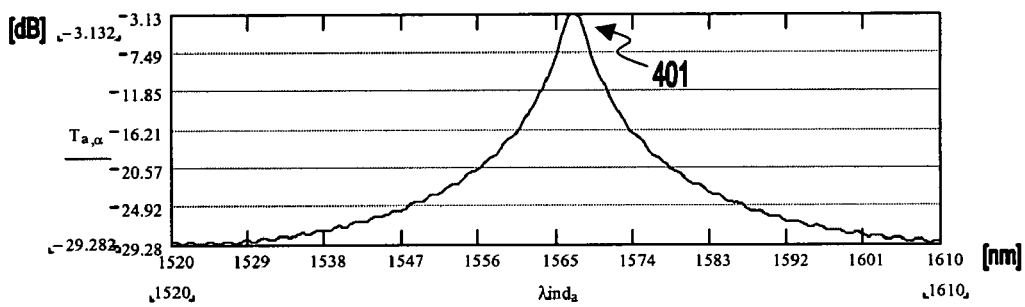
Figure 4:
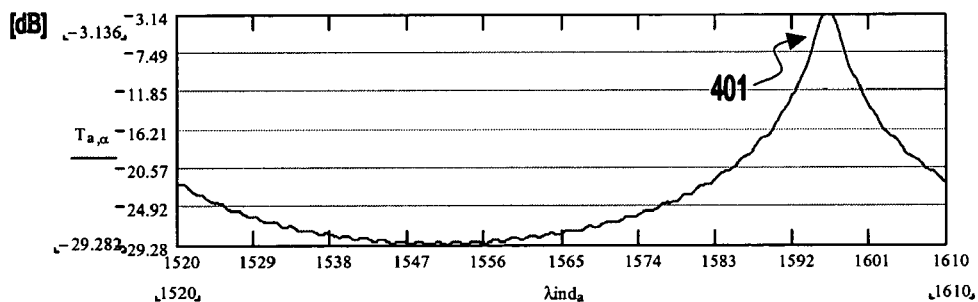

D. Tuning a Low Order Interferometer 1 by Adjusting the Spacing

Where the interferometer of the present invention is constructed as a low order device, that is where the distance between the reflective layers 203 and 204 is small and where there are a few (up to 4) transmission peaks in the wavelength range, certain results are achieved. To illustrate, three plots of the transmission characteristic T(λ) of a low-order interferometer 1 are shown in FIGS. 4A–C. As shown, the value of the spacing d between the two reflective layers varies, that is, for FIG. 4A, $d=d_1=12.971$ μm. For FIG. 4B the spacing d is adjusted to $d=d_2=13.317$ μm. Finally, for FIG. 4C, the spacing d is adjusted to $d=d_3=13.565$ μm. In all three plots, the value of the reflection coefficient $r_1=0.985$, and the value of the reflection coefficient $r_2=0.920$. Finally, the value of the absorption coefficients $a_1=a_2=0.006$. Note: these numbers are not limiting but merely illustrate some characteristics of the low-order interferometer 1 as a tunable filter for both C-band and L-band of DWDM applications.

The three plots reveal some important wavelength filtering properties of the low-order interferometer 1. One important property is the existence of only one main maximum 401 and no secondary maxima in a certain wavelength range if the spacing d between the reflective medium 203 and 204 is within certain limits. The free spectral range (FSR) of the low-order interferometer 1 can be larger than the working wavelength range. A second important property of the low-order interferometer 1 is its continuous tunability, that is, its transmission characteristic can be continuously translated into a large wavelength range, without discontinuities. Tunability is also continuously monotonic, that is, the center wavelength of the main maximum 401 continuously increases when the distance d between the reflective medium 203 and 204 continuously increases. A third important property is that the transmission bandwidth 402 of the main maximum 401 is constant during its scan in the whole wavelength range. Thus, from FIG. 4, it can be seen that less than a 5% change in the spacing d between the reflective medium 203 and 204, scans the main maximum 401 over 71 nm wavelength, which indicates a good sensitivity for tunability.

Figure 5:
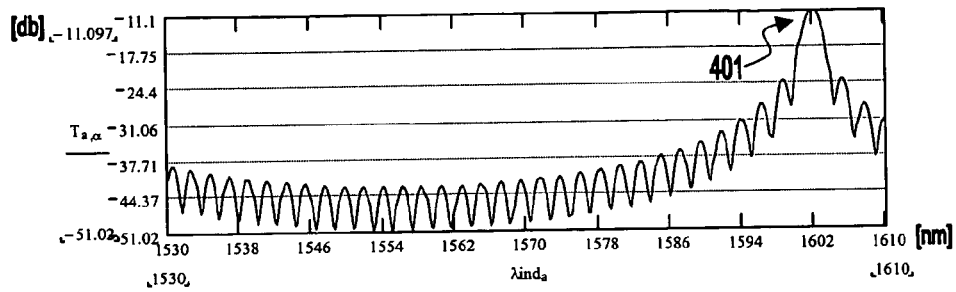
FIG. 5A, FIG. 5B and FIG. 5C are each plot diagrams of the transmission versus wavelength characteristic of one embodiment of a low-order interferometer constructed and operating in accordance with the teachings of the present invention, for three different values of the reflection coefficient of the reflective layer, all the other parameters being unchanged.
Figure 5:
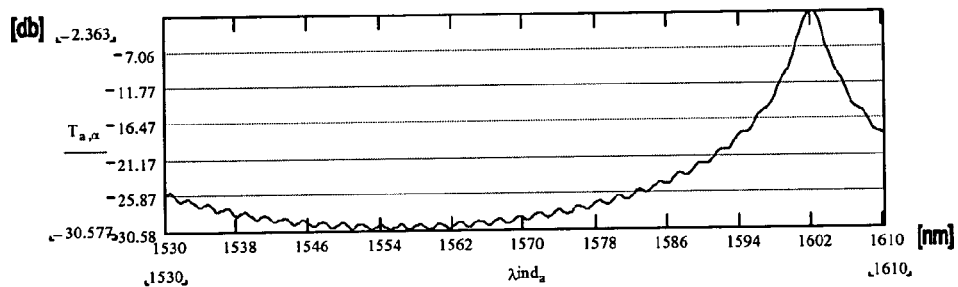
Figure 5:
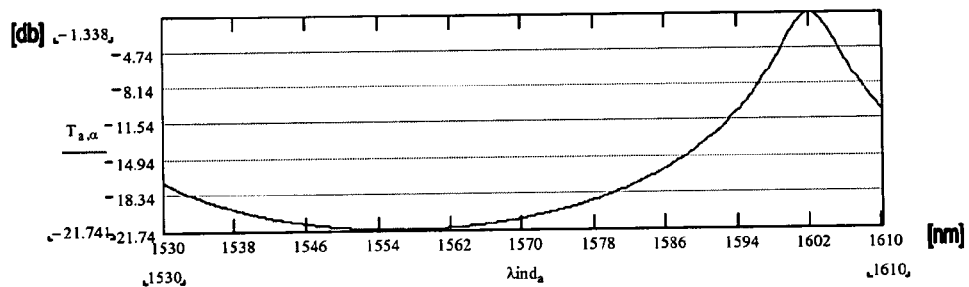

Another feature of the low-order interferometer 1, which is shown in FIGS. 5A–C, is the adjustment of the transfer characteristic T(λ) when the reflection coefficient $r_2$ of the reflective layer 204 changes. Here, the constant parameters are the incidence angle θ=1°, the spacing d between the reflective layers 203 and 204 is $d_s=13.614$ μm, the reflection coefficient of the reflective layer 203 is $r_1=0.995$, and the absorption coefficients of the reflective layers 203 and 204 is $a_1=a_2=0.004$. However, by increasing $r_2$, the wavelength selectivity is better, although the insertion loss becomes higher. The average slope of the transmission characteristic for a 20 dB transmission ratio is about 1.5 dB/nm, much better than a Mach-Zehnder interferometer.

Figure 6:
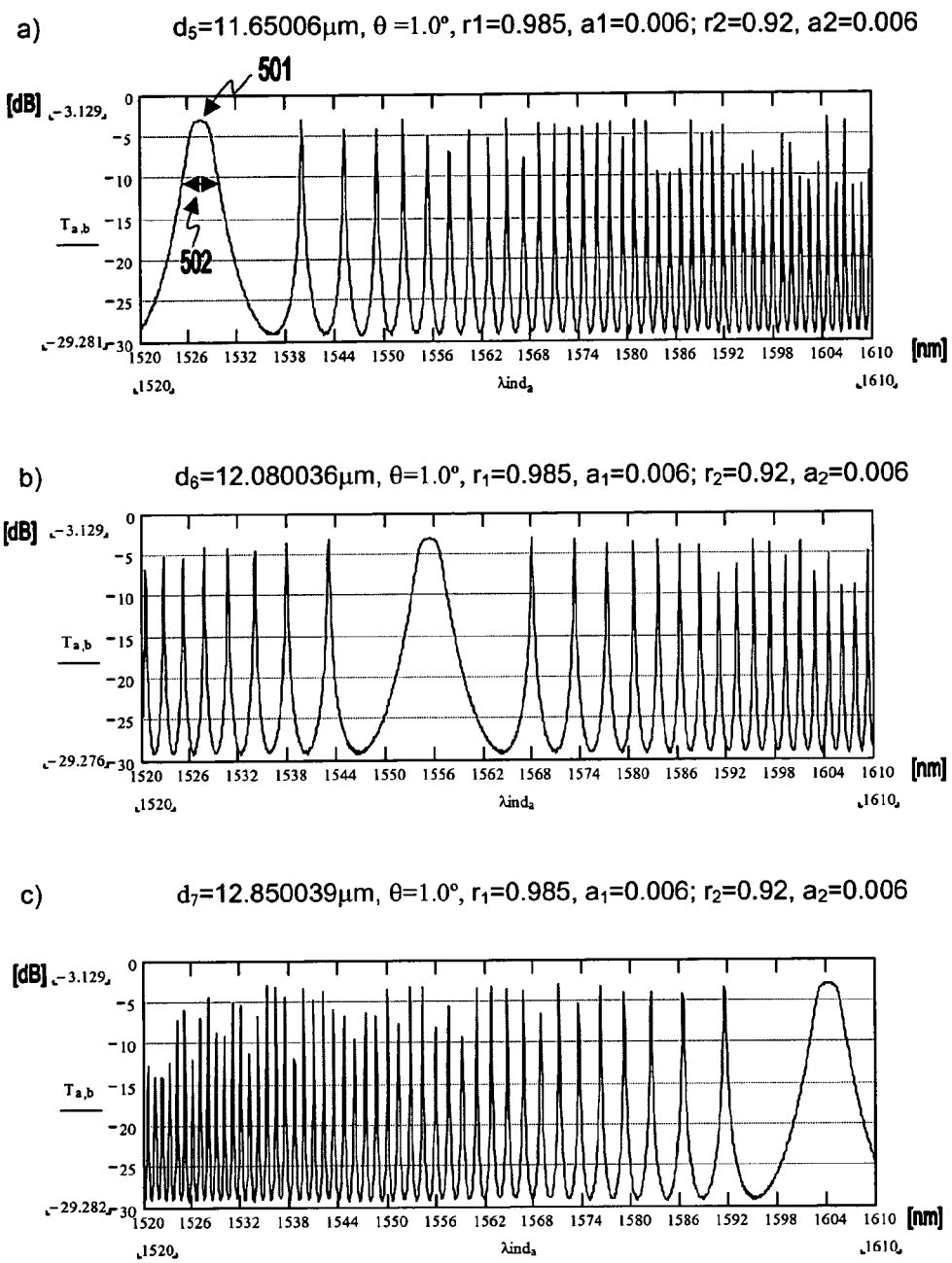
FIG. 6A, FIG. 6B and FIG. 6C are each plot diagrams of the transmission versus wavelength characteristic of one embodiment of a high-order interferometer constructed in accordance with the teachings of the present invention, for three different values of the spacing d between the reflective layers, all the other parameters being unchanged.

E. Tuning a High Order Interferometer 1 by Adjusting the Spacing

Where the interferometer of the present invention is constructed as a high order device, that is where the distance between reflective layers 203 and 204 is relatively large (i.e. the distance is measured in mm's rather than μm's) and where there are a many (more than 4) transmission peaks in the wavelength range, certain results are achieved. To illustrate, three plots of the transmission characteristic T(λ) of a low-order interferometer 1 are shown in FIGS. 6A–C. As shown, the value of the spacing d between the two reflective layers varies, that is, for FIG. 6A, $d=d_1=11.650$ mm. For FIG. 6B the spacing d is adjusted to $d=d_2=12.080$ mm. Finally, for FIG. 6C, the spacing d is adjusted to $d=d_3=12.850$ mm. In all three plots, the value of the reflection coefficient $r_1=0.985$, and the value of the reflection coefficient $r_2=0.920$. Finally, the value of the absorption coefficients $a_1=a_{2=0.006}$. Again, these numbers are not limiting but merely illustrate some characteristics of the high-order interferometer 1 as a tunable filter for both C-band and L-band of DWDM applications.

The three plots show some important wavelength filtering properties of the high-order interferometer 1 according to the present invention: only one main transmission maximum 501 in a given wavelength range can be obtained for certain large values of the spacing d between the reflective layers 203 and 204. The high-order interferometer 1 is fully tunable, i.e. the main maximum 501 can be scanned in the whole wavelength range, but in this case using discreet monotonic values of the spacing d, the number of d values being large enough to allow very good tunability even for DWDM applications in 25 GHz ITU grid. In this case, peak wavelength of the main maximum is not a monotonic function of d. Transmission bandwidth 502 of the main maximum is also constant in the whole tuning range.

Figure 7:
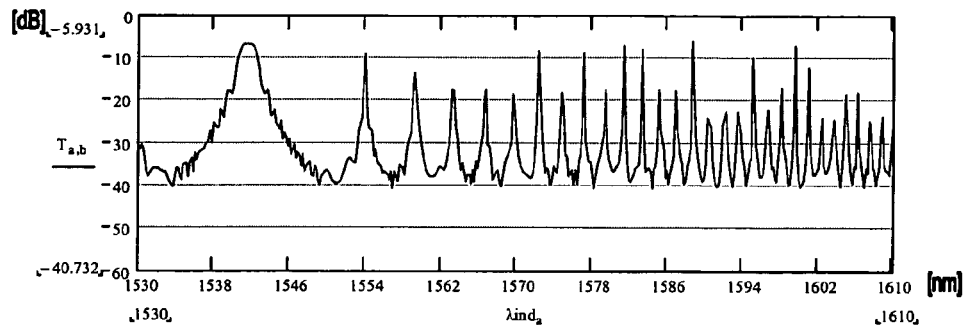
FIG. 7A, FIG. 7B and FIG. 7C are each plot diagrams of the transmission versus wavelength characteristic of one embodiment of a high-order interferometer constructed and operating in accordance with the teachings of present invention, for three different values of the reflection coefficient of the reflective layer, all the other parameters being unchanged.
Figure 7:
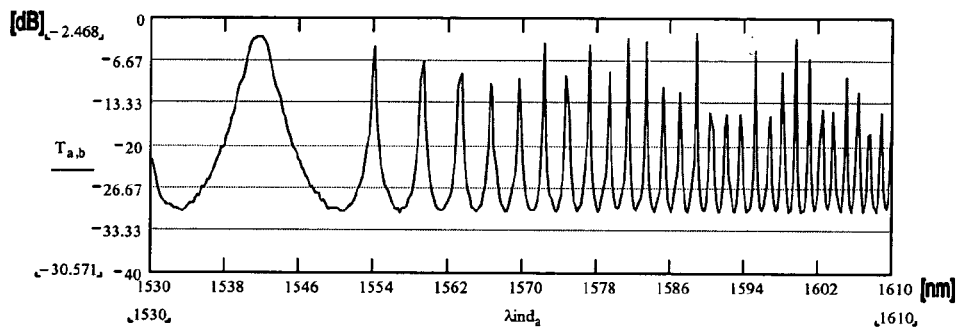
Figure 7:
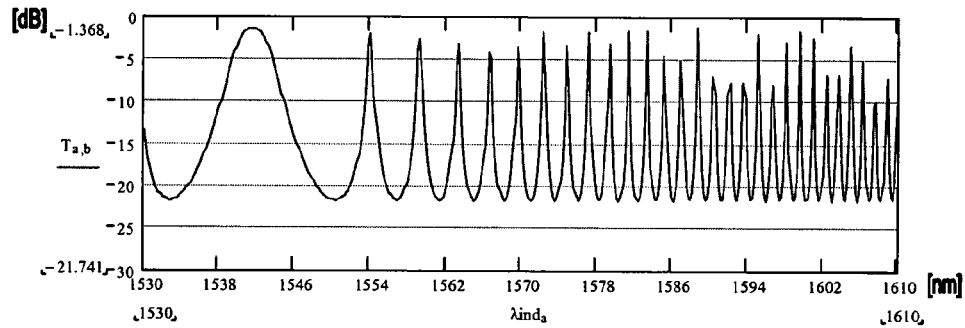

Other features of the high-order interferometer 1 are shown in FIGS. 7A–C. Here, the constant parameters are the incidence angle θ=1°, the spacing d between the reflective layers 203 and 204 is $d_8$=11.850 mm, the reflection coefficient of the reflective layer 203 is $r_1$=0.995, and the absorption coefficients of the reflective layers 203 and 204 is $a_1$=$a_2$=0.004. The three plots show that there is a value of the reflection coefficient $r_2$, i.e., in FIG. 7A, $r_2$.=0.970, in FIG. 7B $r_2$.=0.930, and in FIG. 7C $r_2$.=0.830, for which the interferometer 1 has a minimum insertion loss at minimum bandwidth. As a general rule, the main transmission maximum of the high-order interferometer 1 has steeper slopes and a narrower bandwidth than the transmission maximum of the low-order interferometer 1, for almost the same sensitivity to tunability.

Advantages

The tunable interferometer 1 of the present invention provides a number of advantages in comparison with prior art. The disclosed interferometer has much lower insertion loss than a tunable Fabry-Perot interferometer at the same equivalent finesse, keeping in the same time a constant bandwidth over the tuning range. It has no eigenmodes and by consequence, it is continuously tunable either by a monotonic function, or by a very large number of non-monotonic steps covering a quasi-continuous wavelength range. It can work in any wavelength range, by adjusting the gap between the reflectors and eventually by optimizing the reflectors for the working wavelength range of interest. In one configuration of interferometer 1 use of a controller to monitor the gap between the reflectors into a closed loop system, with a displacement sensor for measuring the gap is provided. Tunable interferometer 1 according to the present invention can work with any polarization of the incident beam, which remains unchanged in the output beam. The input optical port and the output optical port can be easily pig-tailed, facilitating the connection of the tunable interferometer 1 with other optical components and assemblies of a fiber-optics system, including cascade connection of several interferometer 1.

Having now described one or more preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. An optical band pass device, comprising:
   a. a first substrate having a very low absorption loss including an inner surface and an outer surface; said inner surface thereof having a very high reflective coefficient of r1;
   b. a second substrate having a very low absorption loss including an inner surface and an outer surface; said inner surface thereof including: a transmission-optimized optical portion to facilitate input of light beams into said device and a reflective portion having a reflective coefficient of r2 wherein r1 is greater than r2; said outer surface thereof having a transmission coefficient of t to facilitate input and output of light beams in and out of said device; said second substrate mounted parallel to said first substrate with respective inner surfaces facing each other;
   c. a beam collimating element positioned to guide an input light beam to travel through said optical portions of said second substrate, to: 1) hit a first point on said inner surface of said first substrate, 2) reflect off of said first point, at a near normal incidence angle, towards a second point on said reflective portion of said inner surface of said second substrate, said second point spaced from said optical portions so as not to interfere with said input light beam, 3) hit said second point and a) partially reflect off of said second point towards said reflective portion of said inner surface of said second substrate such that there is no interference of reflected beams within said device and b) partially travel through said respective surfaces of said second substrate to generate said one of said output light beams;
   d. an optical medium having a predetermined refractive index located between said inner surfaces of said first and second substrates; and;
   e. an optical converging element spaced from said outer surface of said second substrate for converging said output light beams incident thereon; and;
   f. a displacement transducer for measuring the changes in the spacing between said inner surfaces of said first and second substrates; said displacement transducer to generate a input signal for a controller
   g. a controller for monitoring the tunable operation of said interferometer using said input signal generated by said displacement transducer.

2. A tunable optical band pass device, comprising:
   a. a first substrate having a very low absorption loss including an inner surface and an outer surface; said inner surface thereof having a very high reflective coefficient of r1;
   b. a second substrate having a very low absorption loss including an inner surface and an outer surface; said inner surface thereof including: a transmission-optimized optical portion to facilitate input of light beams into said device and a reflective portion having a reflective coefficient of r2 wherein r1 is greater than r2; said outer surface thereof having a transmission coefficient of t to facilitate input and output of light beams in and out of said device; said second substrate mounted parallel to said first substrate with respective inner surfaces facing each other;
   c. a beam collimating element positioned to guide an input light beam to travel through said optical portions of said second substrate, to: 1) hit a first point on said inner surface of said first substrate, 2) reflect off of said first point, at a near normal incidence angle, towards a second point on said reflective portion of said inner surface of said second substrate, said second point spaced from said optical portions so as not to interfere with said input light beam, 3) hit said second point and a) partially reflect off of said second point towards said reflective portion of said inner surface of said second substrate such that there is no interference of reflected beams within said device and b) partially travel through said respective surfaces of said second substrate to generate said one of said output light beams;

d. an optical medium having a predetermined refractive index located between said inner surfaces of said first and second substrates; and;
e. an optical converging element spaced from said outer surface of said second substrate for converging said output light beams incident thereon;
f. an adjustable spacer positioned between said inner surfaces of said first and second substrates for parallel mounting of said substrates and for adjusting the spacing between said inner surfaces;
g. a refractive index adjuster for adjusting the refractive index of said optical medium;
h. a displacement transducer for measuring the changes in the spacing between said inner surfaces of said first and second substrates; said displacement transducer to generate a input signal to be used by a controller; and;
i. a controller for monitoring the tunable operation of said interferometer using said input signal generated by said displacement transducer.

3. An optical band pass device as in claim 2 wherein said near normal incidence angle is approximately 1 degree.

4. An optical band pass device as in claim 2 wherein said input light beam is a collimated light beam.

5. An optical band pass device as in claim 2 further comprising a first voltage source connected to said adjustable spacer for electrically adjusting the spacing between said first and second substrates.

6. An optical band pass device as in claim 5 further comprising a second voltage source connected to said refractive index adjuster for electrically adjusting the refractive index of said optical medium.

7. An optical band pass device as in claim 5 wherein said adjustable spacer is a piezo-electric control voltage device.

8. An optical band pass device as in claim 6 wherein said refractive index adjuster is a voltage controlled electro-optical device.

9. An optical band pass device as in claim 2 wherein said optical converging element is chosen from the group consisting of a spherical lens system, an aspherical lens system, a gradient-index (GRIN) lens system, any combination of the foregoing systems, and any other optical converging system constructed to collect and converge said output light beams.

10. An optical band pass device as in claim 9 wherein said optical converging element converges said output light beams incident thereon into a focused spot.

11. An optical band pass device as in claim 10 wherein said focused spot is an input aperture of an output optical fiber.

12. An optical band pass device, comprising:
a. a first substrate having a very low absorption loss including an inner surface and an outer surface; said inner surface thereof having a very high reflective coefficient of r1;
b. a second substrate having a very low absorption loss including an inner surface and an outer surface; said inner surface thereof including; a transmission-optimized optical portion to facilitate input of light beams into said device and a reflective portion having a reflective coefficient of r2 wherein r1 is greater than r2; said outer surface thereof having a transmission coefficient of t to facilitate input and output of light beams in and out of said device, said second substrate mounted parallel to said first substrate with respective inner surfaces facing each other and said spacing between said inner surfaces being comparable with one wavelength of light;
c. a beam collimating element positioned to guide an input light beam to travel through said optical portions of said second substrate, to: 1) hit a first point on said inner surface of said first substrate, 2) reflect off of said first point, at a near normal incidence angle, towards a second point on said reflective portion of said inner surface of said second substrate, said second point spaced from said optical portions so as not to interfere with said input light beam, 3) hit said second point and a) partially reflect off of said second point towards said reflective portion of said inner surface of said second substrate such that there is no interference of reflected beams within said device and b) partially travel through said respective surfaces of said second substrate to generate said one of said output light beams;
d. an optical medium having a predetermined refractive index located between said inner surfaces of said first and second substrates
e. an optical converging element spaced from said outer surface of said second substrate for converging said output light beams incident thereon;
f. a displacement transducer for measuring the changes in the spacing between said inner surfaces of said first and second substrates; said displacement transducer to generate an input signal for a controller; and;
g. a controller for monitoring the tunable operation of said interferometer using said input signal generated by said displacement transducer.

13. A tunable optical band pass device, comprising:
a. a first substrate having a very low absorption loss including an inner surface and an outer surface; said inner surface thereof having a very high reflective coefficient of r1;
b. a second substrate having a very low absorption loss including an inner surface and an outer surface; said inner surface thereof including: a transmission-optimized optical portion to facilitate input of light beams into the device and a reflective portion having a reflective coefficient of r2 wherein r1 is greater than r2; said outer surface thereof having a transmission coefficient of t to facilitate input and output of light beams in and out of said device, said second substrate mounted parallel to said first substrate with respective inner surfaces facing each other and said spacing between said inner surfaces being comparable with one wavelength of light;
c. a beam collimating element positioned to guide an input light beam to travel through said optical portions of said second substrate, to: 1) hit a first point on said inner surface of said first substrate, 2) reflect off of said first point, at a near normal incidence angle, towards a second point on said reflective portion of said inner surface of said second substrate, said second point spaced from said optical portions so as not to interfere with said input light beam, 3) hit said second point and a) partially reflect off of said second point towards said reflective portion of said inner surface of said second substrate such that there is no interference of reflected beams within said device and b) partially travel through said respective surfaces of said second substrate to generate said one of said output light beams;
d. an optical medium having a predetermined refractive index located between said inner surfaces of said first and second substrates;
e. an optical converging element spaced from said outer surface of said second substrate for converging said output light beams incident thereon;

f. an adjustable spacer positioned between said inner surfaces of said first and second substrates for parallel mounting of said substrates and for adjusting the spacing between said inner surfaces;

g. a refractive index adjuster for adjusting the refractive index of said optical medium;

h. a displacement transducer for measuring the changes in the spacing between said inner surfaces of said first and second substrates; said displacement transducer to generate a input signal to be used by a controller; and;

i. a controller for monitoring the tunable operation of said interferometer using said input signal generated by said displacement transducer.

14. An optical band pass device as in claim 13 wherein said near normal incidence angle is approximately 1 degree.

15. An optical band pass device as in claim 13 wherein said input light beam is a collimated light beam.

16. An optical band pass device as in claim 13 further comprising a first voltage source connected to said adjustable spacer for electrically adjusting the spacing between said inner surfaces of said first and second substrates.

17. An optical band pass device as in claim 16 further comprising a second voltage source connected to said refractive index adjuster for electrically adjusting the refractive index of said optical medium.

18. An optical band pass device as in claim 16 wherein said adjustable spacer is a piezo-electric control voltage device.

19. An optical band pass device as in claim 17 wherein said refractive index adjuster is a voltage controlled electro-optical device.

20. An optical band pass device as in claim 13 wherein said optical converging element is chosen from the group consisting of a spherical lens system, an aspherical lens system, a gradient-index (GRIN) lens system, any combination of the foregoing systems, and any other optical converging system constructed to collect and converge said output light beams.

21. An optical band pass device as in claim 20 wherein said optical converging element converges said output light beams incident thereon into a focused spot.

22. An optical band pass device as in claim 21 wherein said focused spot is an input aperture of an output optical fiber.

23. An optical band pass device, comprising:

a. a first substrate having a very low absorption loss including an inner surface and an outer surface; said inner surface thereof including a first transmission-optimized optical portion and a reflective portion having a very high reflective coefficient of r1; said outer surface thereof including a second transmission-optimized optical portion positioned opposite said first transmission-optimized optical portion; said first and second transmission-optimized optical portions to facilitate input of light beams into said device;

b. a second substrate having a very low absorption loss including an inner surface and an outer surface; said inner surface thereof having a reflective coefficient of r2 wherein r1 is greater than r2; said outer surface thereof having a transmission coefficient of t to enable output of light beams; said second substrate mounted parallel to said first substrate with respective inner surfaces facing each other;

c. a beam collimating element positioned to guide an input light beam to travel through said optical portions of said first substrate, to: 1) hit a first point on said inner surface of said second substrate, 2) a) partially reflect off of said first point, at a near normal incidence angle, towards a second point on said reflective portion of said inner surface of said first substrate, said second point spaced from said optical portions so as not to interfere with said input light beam and b) partially travel through said respective surfaces of said second substrate to generate said one of said output light beams, and 3) hit said second point and reflect off of said second point towards said reflective portion of said inner surface of said second substrate in such a manner that there is no interference of reflected beams within said device;

d. an optical medium having a predetermined refractive index located between said inner surfaces of said first and second substrates;

e. an optical converging element spaced from said outer surface of said second substrate for converging said output light beams incident thereon;

f. a displacement transducer for measuring the changes in the spacing between said inner surfaces; said displacement transducer to generate a input signal for a controller; and g. a controller for monitoring the tunable operation of said interferometer using said input signal generated by said displacement transducer.

24. A tunable optical band pass device, comprising:

a. a first substrate having a very low absorption loss including an inner surface and an outer surface; said inner surface thereof including a first transmission-optimized optical portion and a reflective portion having a very high reflective coefficient of r1; said outer surface thereof including a second transmission-optimized optical portion positioned opposite said first transmission-optimized optical portion; said first and second transmission-optimized optical portions to facilitate input of light beams into said device;

b. a second substrate having a very low absorption loss including an inner surface and an outer surface; said inner surface thereof having a reflective coefficient of r2 wherein r1 is greater than r2; said outer surface thereof having a transmission coefficient of t to enable output of light beams; said second substrate mounted parallel to said first substrate with respective inner surfaces facing each other;

c. a beam collimating element positioned to guide an input light beam to travel through said optical portions of said first substrate, to: 1) hit a first point on said inner surface of said second substrate, 2) a) partially reflect off of said first point, at a near normal incidence angle, towards a second point on said reflective portion of said inner surface of said first substrate, said second point spaced from said optical portions so as not to interfere with said input light beam and b) partially travel through said respective surfaces of said second substrate to generate said one of said output light beams, and 3) hit said second point and reflect off of said second point towards said reflective portion of said inner surface of said second substrate in such a manner that there is no interference of reflected beams within said device;

d. an optical medium having a predetermined refractive index located between said inner surfaces of said first and second substrates;

e. an optical converging element spaced from said outer surface of said second substrate for converging said output light beams incident thereon;

f. an adjustable spacer positioned between said inner surfaces of said first and second substrates for parallel mounting of said substrates and for adjusting the spacing between said inner surfaces;

g. a refractive index adjuster for adjusting the refractive index of said optical medium;

h. a displacement transducer for measuring the changes in the spacing between said inner surfaces of said first and second substrates; said displacement transducer to generate a input signal to be used by a controller; and;

i. a controller for monitoring the tunable operation of said interferometer using said input signal generated by said displacement transducer.

25. An optical band pass device as in claim 24 wherein said near normal incidence angle is approximately 1 degree.

26. An optical band pass device as in claim 24 wherein said input light beam is a collimated light beam.

27. An optical band pass device as in claim 24 further comprising a first voltage source connected to said adjustable spacer for electrically adjusting the spacing between said inner surfaces of said first and second substrates.

28. An optical band pass device as in claim 24 further comprising a second voltage source connected to said refractive index adjuster for electrically adjusting the refractive index of said optical medium.

29. An optical band pass device as in claim 27 wherein said adjustable spacer is a piezo-electric control voltage device.

30. An optical band pass device as in claim 28 wherein said refractive index adjuster is a voltage controlled electro-optical device.

31. An optical band pass device as in claim 24 wherein said optical converging element is chosen from the group consisting of a spherical lens system, an aspherical lens system, a gradient-index (GRIN) lens system, any combination of the foregoing systems, and any other optical converging system constructed to collect and converge said output light beams.

32. An optical band pass device as in claim 31 wherein said optical converging element converges said output light beams incident thereon into a focused spot.

33. An optical band pass device as in claim 32 wherein said focused spot is an input aperture of an output optical fiber.

34. An optical band pass device, comprising:

a. a first substrate having a very low absorption loss including an inner surface and an outer surface; said inner surface thereof including a first transmission-optimized optical portion and a reflective portion having a very high reflective coefficient of r1; said outer surface thereof including a second transmission-optimized optical portion positioned opposite said first transmission-optimized optical portion; said first and second transmission-optimized optical portions to facilitate input of light beams into said device;

b. a second substrate having a very low absorption loss including an inner surface and an outer surface; said inner surface thereof having a reflective coefficient of r2 wherein r1 is greater than r2; said outer surface thereof having a transmission coefficient of t to enable output of light beams; said second substrate mounted parallel to said first substrate with respective inner surfaces facing each other and said spacing between said inner surfaces being comparable with one wavelength of light;

c. a beam collimating element positioned to guide an input light beam to travel through said optical portions of said first substrate, to: 1) hit a first point on said inner surface of said second substrate, 2) a) partially reflect off of said first point, at a near normal incidence angle, towards a second point on said reflective portion of said inner surface of said first substrate, said second point spaced from said optical portions so as not to interfere with said input light beam and b) partially travel through said respective surfaces of said second substrate to generate said one of said output light beams, and 3) hit said second point and reflect off of said second point towards said reflective portion of said inner surface of said second substrate in such a manner that there is no interference of reflected beams within said device;

d. an optical medium having a predetermined refractive index located between said inner surfaces of said first and second substrates;

e. an optical converging element spaced from said outer surface of said second substrate for converging said output light beams incident thereon;

f. a displacement transducer for measuring the changes in the spacing between said inner surfaces of said first and second substrates; said displacement transducer to generate a input signal for a controller; and g. a controller for monitoring the tunable operation of said interferometer using said input signal generated by said displacement transducer.

35. A tunable optical band pass device, comprising:

a. a first substrate having a very low absorption loss including an inner surface and an outer surface; said inner surface thereof including a first transmission-optimized optical portion and a reflective portion having a very high reflective coefficient of r1; said outer surface thereof including a second transmission-optimized optical portion positioned opposite said first transmission-optimized optical portion; said first and second transmission-optimized optical portions to facilitate input of light beams into said device;

b. a second substrate having a very low absorption loss including an inner surface and an outer surface; said inner surface thereof having a reflective coefficient of r2 wherein r1 is greater than r2; said outer surface thereof having a transmission coefficient of t to enable output of light beams; said second substrate mounted parallel to said first substrate with respective inner surfaces facing each other and said spacing between said inner surfaces being comparable with one wavelength of light;

c. a beam collimating element positioned to guide an input light beam to travel through said optical portions of said first substrate, to: 1) hit a first point on said inner surface of said second substrate, 2) a) partially reflect off of said first point, at a near normal incidence angle, towards a second point on said reflective portion of said inner surface of said first substrate, said second point spaced from said optical portions so as not to interfere with said input light beam and b) partially travel through said respective surfaces of said second substrate to generate said one of said output light beams, and 3) hit said second point and reflect off of said second point towards said reflective portion of said inner surface of said second substrate in such a manner that there is no interference of reflected beams within said device;

d. an optical medium having a predetermined refractive index located between said inner surfaces of said first and second substrates; and;

e. an optical converging element spaced from said outer surface of said second substrate for converging said output light beams incident thereon an optical converging element spaced from said outer surface of said second substrate for converging said output light beams incident thereon;

f. an adjustable spacer positioned between said inner surfaces of said first and second substrates for parallel mounting of said substrates and for adjusting the spacing between said inner surfaces;

g. a refractive index adjuster for adjusting the refractive index of said optical medium;

h. a displacement transducer for measuring the changes in the spacing between said inner surfaces of said first and second substrates; said displacement transducer to generate a input signal to be used by a controller; and;

i. a controller for monitoring the tunable operation of said interferometer using said input signal generated by said displacement transducer.

36. An optical band pass device as in claim 35 wherein said near normal incidence angle is approximately 1 degree.

37. An optical band pass device as in claim 35 wherein said input light beam is a collimated light beam.

38. An optical band pass device as in claim 35 further comprising a first voltage source connected to said adjustable spacer for electrically adjusting the spacing between said inner surfaces of said first and second substrates.

39. An optical band pass device as in claim 38 further comprising a second voltage source connected to said refractive index adjuster for electrically adjusting the refractive index of said optical medium.

40. An optical band pass device as in claim 38 wherein said adjustable spacer is a piezo-electric control voltage device.

41. An optical band pass device as in claim 39 wherein said refractive index adjuster is a voltage controlled electro-optical device.

42. An optical band pass device as in claim 35 wherein said optical converging element is chosen from the group consisting of a spherical lens system, an aspherical lens system, a gradient-index (GRIN) lens system, any combination of the foregoing systems, and any other optical converging system constructed to collect and converge said output light beams.

43. An optical band pass device as in claim 42 wherein said optical converging element converges said output light beams incident thereon into a focused spot.

44. An optical band pass device as in claim 43 wherein said focused spot is an input aperture of an output optical fiber.

* * * * *